United States Patent [19]
Yano et al.

[11] Patent Number: 6,099,911
[45] Date of Patent: *Aug. 8, 2000

[54] PROCESS FOR FORMING SILICA FILM

[75] Inventors: Kotaro Yano, Chiba; Yasuo Saito, Chichibu; Keiji Kawasaki, Chiba, all of Japan

[73] Assignee: Showa Denko K.K., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/944,197

[22] Filed: Oct. 3, 1997

[30] Foreign Application Priority Data

Oct. 4, 1996 [JP] Japan ................................ 8-264439

[51] Int. Cl.$^7$ ...................................................... B05D 3/02
[52] U.S. Cl. .................... 427/397.7; 427/435; 427/443.2
[58] Field of Search ................................ 427/435, 443.2, 427/397.7

[56] References Cited

U.S. PATENT DOCUMENTS 4,375,373  3/1983  Abe et al. .

FOREIGN PATENT DOCUMENTS 0693580   1/1996   European Pat. Off. .
56-38472   4/1981   Japan .
57-196744  12/1982  Japan .
7-196342   8/1995   Japan .

OTHER PUBLICATIONS

Ohsaki et al., "Structural Analysis of $SiO_2$ Gel Films by High Energy Electron Diffraction", *J. of Sol–Gel Science and Technology*, 2, 245–249, (1994) (No month available.).

Kagaku Kogaku Ronbunshu (Reports on Chemical Engineering), vol. 21, No. 5, pp. 879–885, 1995.

Effects of $H_2O$ on structure of acid–catalysed $SiO_2$ sol–gel films, Journal of Non–Crystalline Solids 183 (1995) Apr. 11, No. 3, pp 260–267.

*Primary Examiner*—Bernard Pianalto
*Attorney, Agent, or Firm*—Sughrue, Mion, Zinn, Macpeak & Seas, PLLC

[57] ABSTRACT

A process for forming a silica film on a substrate, comprising the steps of preparing a liquid composition comprising silicic acid, water, an alkali and an organic solvent, said liquid composition having a volume ratio of water to the organic solvent in a range of 0.2 to 10.0 and a concentration of silicon element in a range of 0.0001 to 5.0 mol/l; contacting a surface of a substrate with the liquid composition; and maintaining the contact between the surface of the substrate with the liquid composition to selectively deposit silica on the surface of the substrate until a silica film is formed on the surface of the substrate.

17 Claims, No Drawings

PROCESS FOR FORMING SILICA FILM

BACKGROUND OF THE INVENTION

1. Field of the Invention

The present invention relates to a process for forming a silica film by selective deposition onto a substrate from a liquid composition and a composition for use in this process. The process is simple and easy in handling the composition and can be applied to variety of substrates. The obtained silica films can be used as various insulating films, protecting films and so on.

2. Description of the Related Art

The generally known and used process for forming a silica film for use as an insulating film or a protecting film is that a composition obtained by hydrolysis of alkoxysilane in the presence of an acidic catalyst is coated on a substrate, followed by drying and heat treating the coated composition to form a silica film (for example, Japanese Unexamined Patent Publication (Kokai) No. 56-38472). However, this process has problems in coverage of the coating, appearance of cracks due to drying shrinkage, adhesion to substrates and so on.

Recently, formation of a silica film by deposition from a liquid composition has been attempted to solve the above problems. For example, (i) a substrate is immersed in an aqueous solution of silicofluoric acid in which silicon dioxide has been dissolved to a supersaturation level, to deposit a silica film on the substrate in a liquid phase (for example, Japanese Unexamined Patent Publication (Kokai) No. 57-196744), (ii) alkoxysilane having a hydrophobic group is hydrolyzed to form a silica film on a substrate (for example, Japanese Unexamined Patent Publication (Kokai) No. 7-196342), and (iii) fine silica particles are dispersed in ethanol, tetraethoxysilane is added, and a combination of water, ammonia and ethanol is added, by which silica particles grow (Kagaku Kogaku Ronbunshu (Reports on Chemical Engineering), Vol. 21, No. 5, pp 879–885, 1995), can be mentioned.

However, these methods have the following problems. In the method (i), the solution contains fluoric acid, which makes the handling difficult and limits the substrate due to its corrosive action. In the method (ii), the deposited film contains carbon and fluoride and heat treatment at a high temperature is required to remove these components. It can also mentioned that silicic acid having no hydrophobic group cannot be used. In the method (iii), two pots are used including one for a substrate, tetraethoxysilane and ethanol and the other for water, ammonia and ethanol. This is because if one pot containing all components is prepared and a substrate is then immersed in that solution, a large amount of precipitation is generated soon after the solution is prepared before the immersion of the substrate, which makes the solution inappropriate for deposition of a silica film on a substrate. On the other hand, in the two pot system, an operation of terminating deposition such as dilution of the solution with a large amount of alcohol is required. Accordingly, a continuous process using the same composition is difficult, efficiencies of using starting materials and solvents are low, and the productivity is low, so that it is not suitable in production in industrial scale. The alkali suggested therein is only ammonia and capability of deposition with other alkalis was not confirmed.

SUMMARY OF THE INVENTION

The object of the present invention is to solve the above various problems relating to the methods of forming a silica film in the prior art and to provide a method for forming a silica film and a composition therefor, which do not involve corrosion problem, are easy in handling, do not limit the substrate, allow continuous deposition, and provide a uniform film without heat treatment.

The inventors previously developed a method of contacting a substrate with an aqueous solution containing tetraethoxysilane and alkali to form a silica film on the substrate (Japanese Patent Application No. 8-60893). However, in this method, the utilizable alkali is limited and general non-volatile alkalis such as sodium hydroxide and sodium hydrogencarbonate do not allow deposition or make the rate of deposition extremely slow.

The inventors have improved the above method and reached the present invention, which is a process for forming a silica film on a substrate, comprising the steps of preparing a liquid composition comprising silicic acid, water, an alkali and an organic solvent, said liquid composition having a volume ratio of water to the organic solvent in a range of 0.2 to 10.0, preferably 0.2 to less than 0.5, and a concentration of silicon element in a range of 0.0001 to 5.0 mol/l, preferably 0.0001 to 0.1 mol/l; contacting a surface of a substrate with said composition; and maintaining said contact between said surface of said substrate with said liquid composition to selectively deposit silica on said surface of said substrate until a silica film is formed on said surface of said substrate.

In the process and the liquid composition used therein, by only contacting a substrate with the liquid composition, a uniform silica film can be continuously formed without heat treatment and, further, general non-volatile alkalis such as sodium hydroxide and sodium hydrogencarbonate can be also used.

DETAILED DESCRIPTION OF THE PREFERRED EMBODIMENTS

The silicic acid used in the present invention is orthosilicic acid $H_4SiO_4$ or a polymer of orthosilicic acid such as metasilicic acid $H_2SiO_3$, mesodisilicic acid $H_2Si_2O_5$, mesotrisilicic acid $H_4Si_3O_8$ and mesotetrasilicic acid $H_6Si_4O_{11}$ (ENCYCLOPEDIA CHIMICA, 1969). The silicic acid does not contain any organic group or a halogen.

The silicic acid in the liquid composition can be provided from a precursor thereof, for example, by hydrolysis of, for example, tetraalkoxysilanes $Si(OR)_4$ wherein R is a hydrocarbon group, particularly a $C_1$ to $C_6$ aliphatic group, more specifically tetramethoxysilane, tetraethoxysilane, tetranormalpropoxysilane, tetraisopropoxysilane, tetranormalbutoxysilane, etc., most preferably tetraethoxysilane, by adding and stirring it with water, an alkali and an organic solvent.

It is noted that silicic acid having a hydrophobic group such as a hydrocarbon group, a halogen and hydrogen, represented by $XSi(OH)_3$ where X stands for a hydrophobic group such as a hydrocarbon group, a halogen and hydrogen does not provide the silicic acid used in the present invention. Therefore, in the present invention, a precursor such as trialkoxyalkylsilane, dialkoxydialkylsilane, trialkoxysilane, dialkoxysilane, etc. is not appropriate.

Alternatively, in the present invention, silane tetrahalogenide may be hydrolyzed by adding with water, an alkali and an organic solvent, to provide the silicic acid. Furthermore, water glass may be treated with an cation exchange resin and an alkali and an organic solvent be added to obtain a solution containing the silicic acid.

The starting materials of tetraalkoxysilanes, silane tetrahalogenides or water glass may be any which are available as commercial grade or as chemical reagent grade. A higher purity of the starting material is preferable, but a starting material containing unreacted materials may be also used.

The amount of the silicic acid in the liquid composition is not particularly limited, but is preferably in a range of 0.0001 to 5.0 mol/l, more preferably in a range of 0.0001 to 0.1 mol/l, based on the silicon element contained in the silicic acid or the precursor thereof. The amount of silicon element may be calculated from the amount of the starting material or precursor, for example, tetraalkoxysilane added, but can be also measured by atomic absorption spectrochemical analysis of the composition. In the measurement, the silicon element has a spectrum at a wavelength of 251.6 nm and a frame may be acetylene/nitrous oxide. If the amount of silicon is less than 0.0001 mol/l, the rate of deposition of silica is so low that the process is not practical. If the amount of silicon is more than 5.0 mol/l, precipitation may occur in the liquid composition.

The water used in the present invention is not particularly limited but is preferably water from which particles have been removed by filtration. If the water contains particles, the rate of utilization of starting materials is lowered by the deposition on the particles and the particles may be included in the deposited film deteriorating the uniformity of the film.

The water is used in such an amount that the volume ratio between water to the organic solvent is in a range of 0.2 to 10.0, preferably in a range of 0.2 to less than 0.5. Outside the range, the deposition may become difficult or the rate of deposition may be extremely low.

The alkali used in the present invention is not particularly limited but may include inorganic alkalis such as ammonia, sodium hydroxide and potassium hydroxide; inorganic alkali salts such as sodium carbonate and sodium hydrogencarbonate; organic alkalis such as monomethyl amine, dimethyl amine, trimethyl amine, monoethyl amine, diethyl amine, triethyl amine, pyridine, aniline, choline, tetramethylammoniumhydroxide and guanidine; and alkaline salts of organic acids such as ammonium formate, ammonium acetate, monomethylamine formate, dimethylamine formate, pyridine lactate guanidinoacetic acid and aniline acetate. Among them, particularly preferred are sodium carbonate, sodium hydrogencarbonate, ammonium formate and ammonium acetate.

The alkali used in the present invention may be any one which is available as a commercial grade or as a chemical reagent grade. A higher purity of the alkali is more preferable.

An elevation of the temperature for deposition is advantageous to increase the rate of deposition. In this case, it is preferred that the alkali and organic solvent used are not volatile or decomposable at the heated or deposition temperature. The alkali used may be single or a combination.

The amount of the alkali used may be, for example, from a minor amount of about 0.002 mol/l to a large amount of about 1 mol/l in the case of sodium carbonate. However, if too much solid alkali is added, the alkali may be included in a deposited film making the film nonuniform.

The pH of the liquid composition is not particularly limited as long as it is alkaline, but preferable in a range of 8 to 14. Outside this range, the deposition may become difficult or the rate of deposition may be low, or precipitation may occur in the liquid composition.

The organic solvent used in the present invention is preferably an organic solvent which provides a uniform solution for the liquid composition. For example, alcohols such as methanol, ethanol, propanol and penthanol; ether acetals such as tetrahydrofuran and 1,4-dioxane; ketones such as acetaldehyde, acetone, diacetone alcohol, methylethylketone; and polyhydric alcohol derivatives such as ethyleneglycol, propyleneglycol and diethyleneglycol, may be used. Among them, methanol, ethanol, propanol, penthanol, tetrahydrofran, 1,4-dioxane and acetone are particularly preferred. The organic solvent used may be single or a combination.

The organic solvent used in the present invention may be any one which is available as a commercial grade or as a chemical reagent grade. A higher purity of the organic solvent is more preferable.

The preparation of the liquid composition for forming a silica film in accordance with the present invention may follow the general method. For example, predetermined amounts of alkali, water and organic solvent are added and stirred, followed by adding and stirring a silicic acid precursor such as tetraethoxysilane. However, the order of addition of the components is not limited. It is preferable that both water and a silicic acid precursor such as tetraethoxysilane are diluted in an organic solvent before mixing them, from the viewpoint of control of reaction.

The thus prepared liquid composition for forming a silica film in accordance with the present invention is stable and does not substantially cause precipitation before contacting with a substrate. Essentially only after the liquid composition contacts a substrate, does deposition selectively start on a surface of the substrate.

The process of forming a silica film on a substrate is described below:

Basically, a silica film is formed simply by keeping a substrate in contact with the above liquid composition, typically by immersing a substrate in a liquid composition, at a predetermined temperature. A liquid composition may be first prepared, in which a substrate may then be placed. Alternatively, a substrate is first put in a vessel in which a liquid composition may then be prepared or poured. Further, the liquid composition may be applied or coated on a surface of a substrate to keep the surface of the substrate in contact with the liquid composition for a certain time period. In any case, a silica film is formed selectively on surface of the substrate while the liquid composition substantially remains on the surface.

The silica film is formed by selective deposition onto the surface of the substrate from a liquid composition. This is different from the conventional process comprising coating a surface of a substrate with a coating composition, for example, by dipping or spraying, followed by heat treating the composition to form a silica film. In the conventional process, the coated composition is entirely converted to silica by the heat treatment, i.e., pyrolysis, etc., and the coated liquid composition on the substrate disappears after the heat treatment. However, in the present invention, the heat treatment for conversion of the liquid composition to silica by pyrolysis, etc. is not carried out. A heat treatment is not necessary. The deposition proceeds as selective deposition of silica from a liquid composition containing silicic acid, and the liquid composition remains as a liquid phase and does not disappear even after the deposition. Although heating may be conducted during the deposition in the present invention, the above selective deposition mechanism is not changed and only the rate of selective deposition is increased by the heating.

Since the silica film is formed by selective deposition onto the surface of the substrate, the thickness of the silica film increases as the time of selective decomposition is prolonged. If the concentration of the silicic acid in the liquid composition however decreases, the rate of decomposition significantly lowers. A continuous deposition can be attained by adding the consumed silicic acid to the liquid composition on demand. In the liquid composition, a substrate is immersed in a certain time period and then removed to the outside of the system, followed by another substrate being immersed and removed after a certain time period, by repetition of which a continuous process with a high productivity can be provided.

The temperature during the selective deposition is not particularly limited as long as the liquid composition substantially remains, but is preferably in a range of 10 to 100° C., more preferably in a range of 10 to 50° C., most preferably in a range of 10 to 40° C. The process of the present invention is advantageous in that the process does not require any heat treatment for the deposition of a silica film. That is, the process may be advantageously carried out at room temperature. Raising the temperature during the selective deposition is however preferred for accelerating the rate of deposition. Nevertheless, if the temperature is too high, the composition may be easily changed due to evaporation of components in the liquid composition, which is not preferred.

After the formation of a silica film, the substrate with the silica film formed thereon may be taken out of the liquid composition, optionally washed with, for example, water or an organic solvent, and then dried.

The silica film obtained on a substrate is inorganic silica, that is, it does not contain any organic components or halogens, even if the deposition is conducted without heating.

The obtained silica film does not need to be heat treated, although it may be heat treated if desired.

The substrate used in the present invention may be any material such as a metal, a ceramic, a plastic, carbon, etc. and may be in any form such as plate, a pipe, particles, fibers, etc. The substrate is basically not silica. The substrate may be a material which deforms at an elevated temperature. The substrate may be used after it is subjected to surface treatment.

In accordance with the present invention, there is provided a method for forming a silica film and a composition therefor, which do not involve corrosion problem, are easy to handle, do not limit the substrate, allow continuous deposition, and provide a uniform film without heat treatment. By this, the problems associated with the conventional process of forming a silica film have been solved and a new process for forming a silica film adapted to a industrial scale production can be provided.

EXAMPLES

The present invention is now described with reference to examples of the present invention, to which the present invention is of course not limited.

Example 1

Into a 1000 ml-beaker, 100 ml of water, 400 ml of ethanol (manufactured by Junsei Kagaku) and 0.012 mol of sodium hydrogencarbonate (manufactured by Junsei Kagaku) were charged and, while stirring with a magnetic stirrer, 0.0045 mol of tetraethoxysilane (manufactured by Nakaritex) was then added to obtain a composition or solution for forming a coating. This was done at a temperature of 20° C. and the state of the solution was checked by naked eye.

The substrate used was a silicon wafer which was cleaned in acetone, with ultrasonic waves, at 25° C. for 1 hour and partially covered with a mask for film thickness measurement. The substrate was immersed in the above solution at room temperature, i.e., 20° C. and kept at that temperature for 17 hours, by which a film was deposited on the substrate. During the deposition, the solution was clear and no precipitation was observed.

The substrate was then taken out from the solution, washed with flowing water, and dried by blowing dried air. The thickness of the obtained film was measured using a stepmeter (DEKTAK3030 manufactured by SLOAN) to be 150 nm.

Examples 2 to 11

The procedures of Example 1 were repeated to form a film and to measure the thickness of the film, but the materials of the alkali and solvent and the concentration of the silicon were changed.

The results are shown in Table 1.

TABLE 1

| Ex. No. | alkali | organic solvent | conc. of silicon (mol/l) | water/ organic solvent volume ratio | depo time (hr) | thickness (nm) |
| --- | --- | --- | --- | --- | --- | --- |
| 1 | CN | ET | 0.009 | 0.25 | 17 | 150 |
| 2 | AM | ET | 0.009 | 0.25 | 5 | 50 |
| 3 | PZ | ET | 0.009 | 0.25 | 17 | 20 |
| 4 | CN | IPA | 0.009 | 0.25 | 17 | 80 |
| 5 | CN | THF | 0.009 | 0.25 | 22 | 120 |
| 6 | CN | AC | 0.009 | 0.25 | 5 | 50 |
| 7 | CN | ET | 0.09 | 0.25 | 27 | 270 |
| 8 | CN | ET | 0.002 | 0.25 | 100 | 50 |
| 9 | CN | ET | 0.009 | 0.5 | 17 | 10 |
| 10 | CA | ET | 0.7 | 10.0 | 17 | 130 |
| 11 | CN | ET | 4.0 | 5 | 5 | 180 |

Note 1)
CN: Sodium hydrogencarbonate
AM: Ammonia
PZ: Pyridine
CA: Ammonium hydrogencarbonate
Amount of alkali was 0.012 mol for all Examples.
Note 2)
ET: Ethanol
IPA: Isopropanol
THF: Tetrahydrofran
AC: Acetone Example 12

The procedures of Example 1 were repeated to form a film and to measure the thickness of the film, but the tetraethoxysilane was changed to tetranormalpropoxysilane (manufacture by Ardorich) and the concentration of silicon element was 0.01 mol/l. After 20 hours, a silica film having a thickness of 40 nm was confirmed.

Example 13

The procedures of Example 1 were repeated to form a film and to measure the thickness of the film, but the tetraethoxysilane was changed to water glass (Water glass No. 3, manufactured by Asahi Denka) and the concentration of silicon element was 0.01 mol/l. After 10 hours, a silica film having a thickness of 20 nm was confirmed.

Example 14

The procedures of Example 1 were repeated to form a film and to measure the thickness of the film, but the temperature during the deposition was 70° C. After 2 hours, a silica film having a thickness of 370 nm was confirmed.

(Evaluation of the formed films)

The films deposited on the substrates in Examples 1 to 14 were analyzed, using FT-IR-8000 manufactured by Nippon Spectrum, for their transmission infra-red absorption spectra. An absorption at 1000 to 1100 $cm^{-1}$ derived from Si-O-Si stretching vibration was observed, but an absorption at 2800 to 3000 $cm^{-1}$ derived from C—H stretching vibration was not observed, to reveal that the films were silica with no organic contents.

What is claimed is:

1. A process for forming a silica film on a substrate, comprising the steps of:

preparing a solution comprising silicic acid, water, an alkali and an organic solvent, said solution having a volume ratio of water to the organic solvent in a range of 0.2 to less than 0.5 and a concentration of silicon as elemental silicon in a range of 0.0001 to 0.1 mol/l;

contacting a surface of a substrate with said solution; and maintaining said contact between said surface of said substrate with said solution to selectively deposit silica on said surface of said substrate until a silica film is formed on said surface of said substrate.

2. The process according to claim 1, wherein said silica film formed on said substrate does not contain any organic components and halogens.

3. The process according to claim 1, wherein said contact between said surface of said substrate with said liquid composition is maintained at a temperature in a range of 10 to 100° C.

4. The process according to claim 1, wherein said contact between said surface of said substrate with said solution is maintained at a temperature of not higher than 40° C.

5. The process according to claim 1, wherein said contact between said surface of said substrate with said solution is maintained at room temperature, i.e., without heating.

6. The process according to claim 1, wherein said contact between said surface of said substrate with said solution is made by immersing said substrate in said solution.

7. The process according to claim 6, wherein after said immersion of said substrate in said solution and said formation of said silica film on said surface of said substrate, the process comprises removing said substrate from said solution and then washing and drying said substrate.

8. The process according to claim 1, wherein said substrate is selected from the group consisting of a metal, a ceramic, a plastic and carbon.

9. The process according to claim 1, wherein said substrate is a material which deforms at a temperature of higher than 100° C.

10. The process according to claim 1, wherein said alkali is at least one compound selected from the group consisting of sodium carbonate, sodium hydrogencarbonate, ammonium formate and ammonium acetate.

11. The process according to claim 1, wherein said liquid composition has a pH in a range of 8 to 14.

12. The process according to claim 1, wherein said organic solvent is at least one compound selected from the group consisting of methanol, ethanol, propanol, pentanol, tetrahydrofran, 1,4-dioxane and acetone.

13. The process according to claim 1, wherein said silicic acid is provided using a precursor thereof.

14. The process according to claim 13, wherein said precursor of said silicic acid is at least one tetraalkoxysilane.

15. The process according to claim 14, wherein said precursor of said silicic acid is tetraethoxysilane.

16. The process according to claim 1, wherein said silicic acid is orthosilicic acid $H_4SiO_4$, or a polymer of orthosilicic acid.

17. A process for forming a silica film on a substrate, comprising the steps of:

preparing a solution comprising silicic acid, water, an alkali and an organic solvent, said solution having a volume ratio of water to the organic solvent in a range of 0.2 to less than 0.5 and a concentration of silicon as elemental silicon in a range of 0.0001 to 0.1 mol/l;

contacting a surface of a substrate with said solution; and maintaining said contact between said surface of said substrate with said solution to selectively deposit silica on said surface of said substrate until a silica film is formed on said surface of said substrate, wherein before and during the deposition step said solution is clear and no precipitation is formed.

\* \* \* \* \*